Sept. 1, 1925.
J. M. GIBBS
BEEHIVE
Filed Nov. 6, 1924
1,552,139
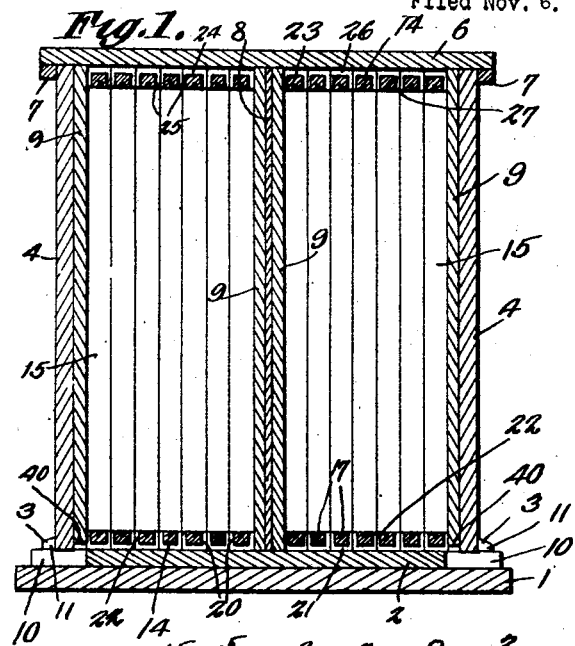
Fig. 1.
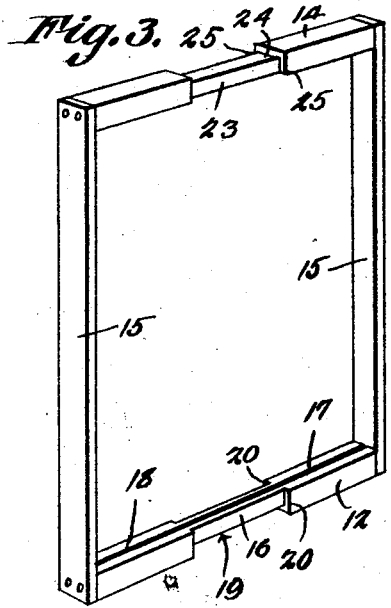
Fig. 3.
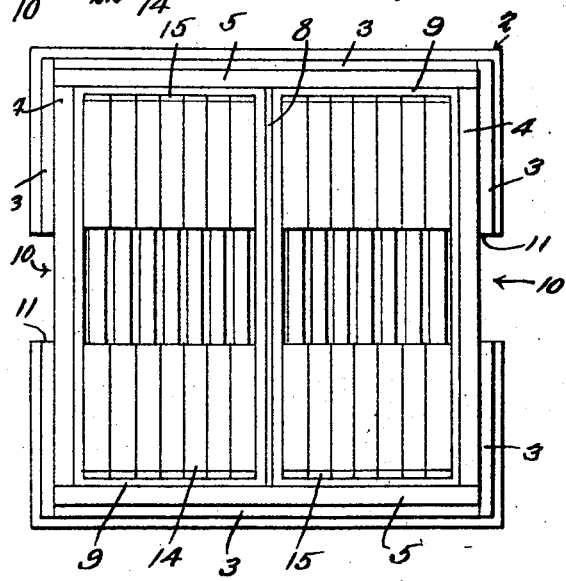
Fig. 2.
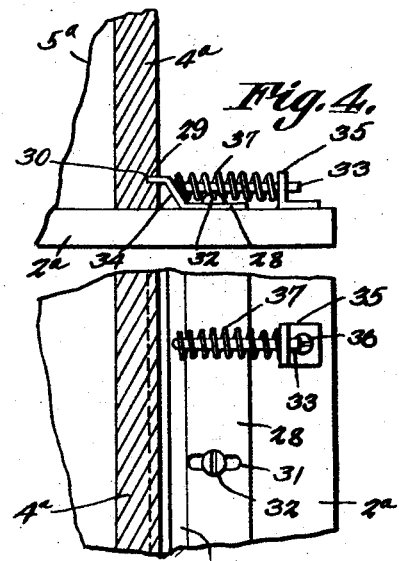
Fig. 4.
Fig. 5.
Fig. 6.
Inventor
J. M. Gibbs
By C. A. Snow & Co.
Attorneys.

Patented Sept. 1, 1925.

1,552,139

UNITED STATES PATENT OFFICE.

JOHN M. GIBBS, OF WYLIESBURG, VIRGINIA.

BEEHIVE.

Application filed November 6, 1924. Serial No. 748,171.

*To all whom it may concern:*

Be it known that I, JOHN M. GIBBS, a citizen of the United States, residing at Wyliesburg, in the county of Charlotte and State of Virginia, have invented a new and useful Beehive, of which the following is a specification.

This invention is a bee hive, and one object of the invention is to provide novel means whereby the bees may find their way into the frames which carry the honey and the comb. Another object of the invention is so to construct the hive that the bees can build in the top or warmest part of the hive.

It is within the province of the disclosure to improve generally and to enhance the utility of device of that type to which the invention appertains.

With the above and other objects in view, the invention consists in the novel construction and arrangement of parts hereinafter described, depicted in the drawings, and claimed, it being understood that, within the scope of what is claimed, a mechanic may make changes in the form selected as an embodiment, without departing from the spirit of the invention, due regard being had to what I claim hereinafter as the distinguishing characteristics of my invention.

In the drawings:

Figure 1 shows in vertical section, a bee hive constructed in accordance with my invention; Figure 2 is a top plan wherein the lid of the bee hive has been removed; Figure 3 is a perspective view showing one of the frames; Figure 4 is a fragmental vertical section disclosing a modification, the lining or packing being omitted; Figure 5 is a top plan wherein the structure of Figure 4 appears; Figure 6 is a sectional view similar to Figure 4 but showing the cleats in relation to the lid.

The numeral 1 marks a pallet, or any suitable support whereon the hive may be erected. A base 2 rests on the pallet 1 and is provided on its upper surface, and near to its edge, with an upstanding rib or cleat 3, within which are located the oppositely disposed sides 4—4 and 5—5 of the hive, the sides 4 being received between the sides 5, as disclosed in Figure 2. The lid 6 of the hive rests on the sides 4 and 5, the sides resting at their lower ends on the base 2. In order to hold the lid 6 in place, the lid has depending cleats 7, engaging the sides 4 and 5.

Should it be desired to provide a double hive, a vertical partition 8 is located within the hive, the partition extending between the sides 5—5, parallel to the sides 4—4, the partition extending between the base 2 and the lid 6. The partition 8 divides the hive into two compartments, in each of which, a tubular lining 9 fits closely but removably, the lining being made of some material which will retain heat. In order to provide a means whereby the bees may enter the hive, the base 2 is provided with oppositely disposed notches or openings 10, extended beneath the sides 4, the outer walls of the linings 9 having notches 40 in their lower edges, the notches being located above the openings 10 in the base 2, the rib 3 being cut away as at 11, so that it does not extend across the openings 10 in the base 2.

A plurality of frames is set up endwise in the hive, within the linings 9, on opposite sides of the partition 8, the frames being supported on the base 2. As is made clear in Figure 3, each frame, comprises an end member or bottom bar 12, an end member or top bar 14, and side strips 15. The bottom bar 12 is provided intermediate its ends with a reduced neck 16, there being a groove 17 in the bar 12 and its neck 16, the groove being adapted to receive the wax 18 from which the bees begin to build. The reduced neck 16 forms a space 19 beneath the neck, and a space 20 on each side of the neck. When the frames are set up on end in the hive, as shown in Figure 1, the spaces 19, together with the notches 40 in the linings 9, form passages 21 immediately above the base 2, these passages communicating with the openings 10 in the base 2 and permitting the bees to pass inwardly toward the center of the hive, it being possible for the bees to find their way upwardly within the frames, because the side spaces 20 in the base bars 12 of adjoining frames cooperate to form vertical openings 22, clearly shown in Figure 1. The top bar 14 of each frame is provided with a reduced neck 23, forming a space 24 above the neck, and forming spaces 25 on each side of the neck, those spaces 25 which are adjacent to the inner and outer walls of the linings 9 forming openings adjacent to said walls. The spaces 25 of the adjoining bars 14 of adjacent racks define vertical openings 27 communicating with a horizontal passage 26, located immediately beneath the lid 6 and formed by the spaces 24 which exist above the necks 23 of the top bars 14.

A packing or lining 9 may be used or omitted, as desired. The packing or lining 9, ordinarily, is employed in the winter season, and, often, will render it unnecessary to stow the hive away in a cellar or elsewhere.

The device is so constructed that the bees may move about readily within the hive, and the bees can work at the upper portion of the hive, it being a matter of common knowledge that the upper portion of a hive generally is warmer than the lower portion.

The hive forming the subject matter of this application generally is made of wood, and the parts thereof tend to swell, when wet. In order to facilitate the setting up and the taking down of the hive, and in order to compensate automatically for the swelling above alluded to, recourse may be had to that form of the invention which is delineated in Figures 4, 5 and 6.

In Figures 4, 5 and 6, parts hereinbefore described have been designated by numerals previously used, with the suffix "a". The cleats, corresponding to the cleats 3 and 7 of Figure 1, are denoted by the numeral 28 and are in the form of plates slidably mounted on the base 2ª and on the lid 6ª, the cleats having elongated slots 31, receiving securing elements 32, such as screws, engaged with the base 2ª and with the lid 6ª, and permitting the cleats to slide inwardly and outwardly, to a limited extent, on the base 2ª and on the lid 6ª. The cleats have upwardly and inwardly inclined webs 34, terminating in approximately horizontal flanges 29, adapted to be received in seats or grooves 30 in the walls of the hive, of which the parts 29—4ª of Figure 4 may be taken as typical. Rods or plungers 33 are secured at their inner ends to the parts 34 of the cleats 28, the outer ends of the rods sliding in guide brackets 35 secured at 36 to the base 2ª and to the lid 6ª. Compression springs 37 surround the rods 33 and abut against the brackets 35 and the webs 34 of the cleats 28, the springs tending to hold the flanges 29 of the cleats yieldably engaged in the seats 30 which are formed in the sides of the hive, thereby to compensate automatically for changes in dimensions arising out of the swelling or contraction of the wood out of which the hive is made.

It will be understood that the mechanism shown in Figures 4, 5 and 6 may be omitted or used, at the will of an operator.

I claim:

1. A bee hive comprising, as cooperating elements, a base and a side, one of said cooperating elements having an entrance, and a plurality of frames within the hive, each frame including a bottom member supported on the base, the bottom member having a reduced neck defining a space below the neck and spaces on each side of the neck, the first-specified spaces of the bottom members of adjoining frames coacting to form a passage leading inwardly from the entrance, and the second-specified spaces of the bottom members of adjoining frames coacting to form openings communicating with the passages and with the interior of the frames.

2. A bee hive comprising, as cooperating elements, a base and a side, one of said cooperating elements having an entrance, and a plurality of frames within the hive, each frame including a top member, and a bottom member supported on the base, each member of the frame having a reduced neck, the necks of the top members defining a space above said necks, and the necks of the bottom members defining a space below said necks, the necks of the top and bottom members defining spaces on each side of said necks, the first-specified spaces of the bottom members forming a passage leading inwardly from the entrance, and the first specified spaces of the top members forming a corresponding passage at the top of the hive, the second specified spaces of the top and bottom members defining openings communicating with the respective passages and with the interior of the frames.

3. A bee hive comprising a base and a side supported thereon, a lining coacting with the side, and having a notch in its lower edge, the base having a notch in its edge, the notch communicating with the notch in the lining, and a plurality of frames within the hive, each frame including a bottom member supported on the base, the bottom member having a reduced neck defining a space below the neck and spaces on each side of the neck, the first-specified spaces of the bottom members of adjoining frames, and the notch in the lining, coacting to form a passage leading inwardly from the notch in the base, and the second-specified spaces of the bottom members of adjoining frames coacting to form openings communicating with the passage and with the interior of the frames.

4. A bee hive comprising a side, and cooperating parts including a base and a lid, one of said cooperating parts carrying a movable cleat coacting with the side, and spring means for holding the cleat yieldably engaged with the side.

5. A bee hive comprising a side, and cooperating parts including a base and a lid, a cleat on one of said cooperating parts and coacting with the side, a bracket on the cooperating part which carries the cleat, a plunger mounted on the cleat and slidable in the bracket, and a compression spring about the plunger and disposed between the bracket and the cleat.

6. A bee hive comprising a side, and co-operating parts including a base and a lid, the side having a seat, a cleat on one of said cooperating parts and received in the seat, a bracket on the cooperating part which carries the cleat, and spring means interposed between the bracket and the cleat to hold the cleat yieldably in the seat.

In testimony that I claim the foregoing as my own, I have hereto affixed my signature.

JOHN M. GIBBS.